Patented May 29, 1951

2,555,224

UNITED STATES PATENT OFFICE 2,555,224

PEARL ESSENCE AND METHOD OF MANUFACTURE

William E. Decker, Wakefield, Mass.

No Drawing. Application December 18, 1947, Serial No. 792,594

2 Claims. (Cl. 106—287)

The present invention relates to ornamental plastic materials having an irridescent lustre and is more particularly concerned with artificial pearl essences capable when properly incorporated in various types of plastic material of imparting thereto a pearly lustre.

Pearl essences have been prepared in the past largely from the scales of certain fishes. Nacreous essences prepared from this natural material have been expensive, because of the complicated series of operations required in their preparation, and also have been subject to the disadvantage that they cannot withstand the elevated temperatures which must be used in coating or shaping operations employed with certain plastic compositions.

Efforts have been made to simulate this natural organic material by the use of inorganic materials, such as finely powdered metals, like aluminum, certain heavy metallic salts, such as bismuth chloride, mercurous chloride and lead salts, and certain double or complex ammonium-phosphate salts of metals such as manganese and zinc. In general, these efforts have not proved successful, in some cases because the pigments are too sensitive to heat or to chemical attack by ingredients or decomposition products of the resins with which they are employed, and in other cases because the pigments have not been prepared in such a form as to permit their incorporation with the resin in a condition such as to produce the desired effect.

On the assumption that the characteristic pearly appearance of fish scales is imparted thereto by some characteristic material present in the fish scale, efforts have been made to determine the chemical nature of this characteristic material in the hope that a pearly irridescence could be imparted to plastics merely by incorporating this characteristic material therein. The characteristic material of fish scales has been thought to be guanine, but all efforts to reproduce the pearly lustre of natural fish scale pearl essence in synthetic plastic materials merely by the incorporation of guanine therein have failed.

The present invention has as an object to provide a method for preparing or treating inorganic crystals so that they can be incorporated in plastic compositions so as to simulate therein the lustrous appearance of the natural pearl. Another object is to provide a pearl essence or concentrate which when properly incorporated in various types of transparent or translucent plastic materials will impart thereto a lustrous pearly ornamental appearance. Various other objects and advantages of the invention will become apparent as the description of the invention proceeds.

I have discovered that the optical properties which impart to a natural pearl its characteristic appearance are to a considerable extent independent of the chemical constitution of the materials present in the pearl material, and cannot be duplicated merely by the use of any one of the materials present in natural pearl or in fish scales. I have discovered that the arrangement, or the state of aggregation, of the various different materials making up the pearl composition is a primary factor in imparting the characteristic pearly lustre. On the basis of these discoveries, I have found that it is possible to form pearl essences, capable of imparting a pearly lustre to plastic materials, from many different organic and inorganic crystalline materials provided the crystalline material conforms to certain requirements as to crystal size, power of reflection, index of refraction and degree of translucency, and provided further that the crystals are first treated with a certain kind of protein hydrolysate, to be described. The crystalline particles, I have found, must be both light reflective and translucent, i. e., not transparent. They should not, however, be completely light reflective. Preferably the crystalline particles are less than about 40 microns in diameter. The crystals also preferably should have an index of refraction different from that of the plastic in which they are to be incorporated.

In accordance with the invention, I have found that the crystalline materials described above may be prepared in such a condition that they will impart a pearly lustre to plastic material, in which they are incorporated, by first associating the crystals with a protein hydrolysate resulting from hydrolysis of a protein material to the stage at which purine and pyrimidine radicals are formed and their bases are present in the hydrolysate.

The crystals may first be formed and then associated with the protein hydrolysate, but I have found that the character and quality of the lustre imparted to the plastic material is greatly improved if the crystalline material is crystallized in the presence of the protein hydrolysate. The crystals and their associated purine and pyrimidine material derived from the protein hydrolysate are prepared in the form of an aqueous dispersion or emulsion, hereinafter referred to for convenience as a dispersion.

These aqueous dispersions of a crystalline material of the proper character, properly prepared by having associated with it material derived from a protein hydrolysate containing purine and pyrimidine radicals, can readily be incorporated in the desired plastic material, such as cellulose-nitrate, for example by introducing small portions of a solution of the cellulose nitrate into an excess of the aqueous emulsion or dispersion of the prepared crystals. Upon the introduction of the solution, the crystals appear to pass over into the cellulose nitrate and release the greater part of the water, which can be decanted. Substantially all of the remaining small amount of water can be removed from the mix by kneading or by extraction with solvents which form low-boiling azeotropic mixtures with water. The product may or may not show an irridescent lustre, but in either case it is suitable for use as a pearl essence for incorporation in plastic materials to form lustrous surface-coating lacquers, molding or casting compositions and the like.

The following examples illustrate particular ways in which pearl essences may be formed in accordance with the invention.

*Example 1.*—The protein hydrolysate is made by hydrolyzing commercial fish glue with 80% hydrochloric acid for about 12 hours at room temperature, at which stage of the hydrolysis pyrimidine and purine bases will be present in the reaction mass. 25 grams of this hydrolyzed fish glue are stirred into 13 gallons of cold water. The mixture is slowly heated. When the temperature reaches 90° C., 437 grams of ammonium hydroxide and 465 grams of phosphoric acid are added simultaneously with stirring and continued heating. When the temperature reaches 97° C., 853 grams of zinc chloride are added with stirring and the mixture immediately cooled rapidly. For the best results, the temperature should be reduced to about 30° C. within 3 minutes. The pH should be between about 6.5 and 7.2. If the pH is below 6.5 it may be raised slightly by washing the crystals with cold water. The product is an aqueous dispersion or emulsion of twelve-sided crystals of zinc ammonium phosphate which have purine and pyrimidine material from the hydrolyzed fish glue associated with them. This product is washed in water and is then suitable for incorporation in various plastic materials.

*Example 2.*—193 grams of a protein hydrolysate prepared from fish glue as described in Example 1 are added to 95 gallons of cold water and the mixture slowly heated. At 55° C., 10,412 grams of sodium ammonium phosphate are added with continued heating and stirring. At 98° C. heating is discontinued and 6232 grams of zinc chloride are added with vigorous agitation. The mixture is then rapidly cooled to 35° C. The resulting zinc ammonium phosphate crystals are twelve-sided and have purine and pyrimidine material associated with them.

*Example 3.*—1000 grams of hide glue is digested in 125 ml. of 30% HCl and 12 liters of water for three hours at 80° C. and then filtered through cheese cloth. 2 liters of the product are boiled down to one liter, to which is added 500 grams (wet weight) of barium thiosulphate crystals with occasional agitation for 24 hours. The crystals are then filtered, stained with methyl blue and examined microscopically. If the crystals appear to be stained blue and heavily banded with blue on their margins, they are washed in cold water with agitation to remove some of the protein material. The washing is repeated until the bodies of the crystals appear to have no stain and the crystals show only a faint blue tint along their margins. The crystals are then in condition for incorporation in plastic material.

Various organic and inorganic materials may be employed as the crystalline material in forming my pearl essence. For example, I may use guanine, xanthine, diphenylguanidine, salicylic acid, and various salts of magnesium, manganese, strontium, cadmium, zinc, lithium, or barium of which salts the compounds of zinc are preferred. Satisfactory results are obtained with the phosphates, thiosulphates, sulphates, permanganates and chromates of these metals. Salts such as barium thiosulphate, magnesium thiosulphate, zinc phosphate, and double salts such as zinc ammonium phosphate, magnesium ammonium phosphate, lithium ammonium phosphate, lithium ammonia sulphate, strontium ammonium phosphate, and barium ammonium thiosulphate give good results. Calcium carbonate may be used. I have found that by the incorporation of iodine in the crystal it is possible to obtain a very satisfactory gold color. The iodine preferably is present as a component of a double salt.

Various different protein hydrolysates are suitable for use in my process. The type of protein which provides the richest source of the purine and pyrimidine radicals required in my process is the nucleoprotein. Nucleoproteins occur widely in the animal and plant kingdoms in nearly all cells, particularly in the nuclei and other chromatin material of the cells. They are found in especially large amounts in glandular tissues such as those of the thymus, pancreas and spleen.

The nucleoproteins are combinations of proteins with a phosphorus containing substance known as nucleic acid. As different nucleic acids exist and are found in combination with different proteins, a variety of nucleoproteins exist. The protein combined with nucleic acid is in certain cases a histone, the conjugated protein in this case being called a nucleohistone.

The nucleic acids of the animal body occur mainly in combination with protein material in the so-called nucleoproteins of which they form the characteristic radicals. The amount and character of the protein with which the nucleic acid molecule is combined varies and the acid may in certain cases be found in cells in a free form. Those tissues are richest in nucleic acid which contain the largest amount of nuclear material and of nucleoprotein.

The nucleic acids on hydrolysis yield phosphoric acid, purine and pyrimidine and a carbohydrate or carbohydate derivative. It is the purine and pyrimidine radicals that are essential to my process and the inorganic crystals are not complete unless associated with these radicals. Since these radicals can not be isolated as such, the crystals are associated with them in their transient state resulting from the hydrolysis of the nucleic acid, which, in turn, is a result of the hydrolysis of the gross protein raw material.

Protein hydrolysates obtained from animal glue such as fish glue and hide glue, from wheat germ, from sunflower seed and from soya beans give particularly satisfactory results when associated with the crystalline material in the manner indicated in the examples, but it will be appreciated from the foregoing that any protein capable of yielding purine and pyrimidine radicals on hydrolysis may be employed as a raw material for the production of the hydrolysate.

The hydrolysate may with advantage be enriched in phosphorous content by the addition of free phosphoric acid or substances capable of yielding nascent phosphates, particularly if the protein raw material is one having a low nucleic acid content.

Hydrolysis of the protein must be carried to the stage at which the purine and pyrimidine radicals are formed and their bases are present in the hydrolysate. The proper degree of hydrolysis can be determined for any particular protein raw material by testing the hydrolysate for the presence of the purine and pyrimidine bases. Their presence indicates that the purine and pyrimidine radicals have been present. The presence of pyrimidine bases may be determined by checking for the presence of cytosine by concentrating 100 cc. of the hydrolysate to 10 cc., cooling to room temperature and examining the material under the microscope for mother of pearl, leafy crystals, insoluble in ether. A murexide test for uric acid is then carried out on the material. (Steudel-Zeitschrift fur Physiologische Chemie, 37 and 38). If the murexide test is positive the hydrolysate is satisfactory for use; if negative, the hydrolysate is not suitable.

If the Kossel test for the presence of the purine radical (Kossel-Zeitschrift fur Physiologische Chemie, 7) is positive, the material is satisfactory for use.

A good practical plant control test is to acidify a sample of the hydrolysate and add phosphotungstic acid. If a precipitate is formed, the hydrolysate can be considered satisfactory for use. Another useful test is the test described by Capranica (Zeitschrift fur Physiologische Chemie, 4). If this test is positive the material may be taken as satisfactory for use.

In working with fish waste and using acid treatment (either acetic acid or hydrochloric acid) I have found that good results are obtained when digestion is allowed to proceed for 12 hours at normal room temperatures, but, if heat (about 80° C.) is applied to accelerate the hydrolysis, about three hours is the maximum time that should be employed. The hydrolytic materials that result from longer treatment than this three hour period have little or no beneficial effect on the crystals. On the other hand, when the hydrolysis of fish protein is effected by an alkaline treatment there appears to be practically no upper time limit. In the case of wheat germ protein, the difference between acid and alkaline hydrolysis in this respect appears to be less well defined.

I have found that when a freshly prepared hydrolysate is employed, the treatment of the crystals with the protein hydrolysate is completed much more effectively and rapidly and also, that the character and lustre of the completed plastic is better.

The amount of protein hydrolysate and the duration of the treatment emyloyed in associating the crystals with the hydrolysate are not critical. It appears to be impossible to overtreat the crystals with the hydrolysate.

I prefer, however, to remove from the product all, or substantially all, excess unassociated hydrolytic products. It appears that a water wash is effective to remove from the essence any excess of hydrolysate over and above that which is essential to or which contributes materially to the formation of the pearly lustre in the final product. Accordingly, I prefer to use an excess of hydrolysate, to minimize the risk of not associating an adequate amount of hydrolysate with the crystals, and then to wash the essence at some stage in its manufacture prior to its incorporation in the plastic. For economic reasons, the excess should be no greater than is required.

When the hydrolytic material is associated with the crystals by crystallizing the crystals in the hydrolysate, it appears to be impossible merely by washing too remove so much of the hydrolytic material as to make the essence ineffective for imparting lustre to the plastic. The more thorough the washing, the more hydrolytic material will be removed, within limits, and variations in the amount of residual hydrolytic material may be made in individual cases as experience may indicate to be desirable.

When the crystals are first formed and subsequently treated with the hydrolysate, it is possible, at least in some cases, to remove so much of the hydrolytic material by washing that it is desirable with essences of this type to determine the proper amount of washing for a given set of manufacturing conditions by microscopic examination of stained crystals as described in Example 4.

The pearl essence of the present invention may be employed with any of the translucent or transparent plastic materials such as, cellulose acetate, cellulose nitrate, the alkyd resins, the vinyl resins, the acrylic resins, etc. In general, I have observed that the best results are obtained when the index of refraction of the crystal employed in the essence differs substantially from the index of refraction of the plastic.

Microscopic examination of the crystalline material associated with a protein hydrolytic material in accordance with the invention discloses that a continuous film is formed on the surface of the crystal so as in effect to encapsulate the crystal. It also appears probable that material from the protein hydrolysate is distributed within the crystal, especially when the crystals are formed in the presence of the hydrolysate. Possibly, in some cases, the association between the crystalline material and the material derived from the protein is in the nature of a chemical combination.

The following is given as an illustration of suitable procedure by which the pearl essence of the present invention may be incorporated in a plastic material. The essence of Example 1, in its liquid form, is incorporated in a solution of cellulose nitrate in conventional mixed solvents by slowly adding the cellulose nitrate to the essence with stirring. In forming a lacquer for surface coating the proportions may be about 1 part of essence to 8 parts of nitrate, by weight, (including the solvent and water). As the cellulose nitrate becomes mixed with the pearl essence, the water gradually separates until, finally, substantially all of the water can be decanted. The decanted water is substantially clear. The remaining small amounts of water can be removed by stirring butanol into the mixture and promoting evaporation by continued stirring. The viscosity of the mixture may be adjusted, if desired, by addition of butyl acetate. The resulting product shows a high lustre of a milky or silky character which is suggestive of natural pearl and which provides a pleasing ornamental effect.

It will be appreciated that various other solvents than the butanol mentioned by way of example above may be added to the mixture of the essence and the resin. In the case of some resins, such as styrene, the use of a high boiling solvent is advantageous. Chloroform is an example of a useful solvent of this character. I have found that chloroform removes from the crystal substantially all of the material derived from the protein, but, nevertheless, the minute amount remaining is sufficient to produce a good lustrous effect.

Certain solvents tend to cause cellulose acetate to increase in viscosity when they are added thereto. Advantage can be taken of this behavior to cause the cellulose acetate to set up quickly when the pearl essence is added to it so as to preserve the desired pattern of distribution of the essence. An example of a solvent of this character is 2-methyl-2,4-pentanediol. When a pearl essence containing this solvent is stirred into cellulose acetate the solvent migrates to the cellulose and causes it to set quickly and prevent further settling or other movement of the crystalline particles.

The foregoing detailed disclosure of particular embodiments of my invention is made by way of illustration and not of limitation. It will be understood that changes in the materials and in the times, temperatures, and other conditions mentioned may be made by one skilled in the art without departure from the invention as expressed in the following claims.

The present application is a continuation-in-part of my application, Serial No. 716,424, filed December 14, 1946, now abandoned.

I claim:
1. A pearl essence suitable for incorporation in a plastic material to impart a pearly lustre thereto consisting essentially of an aqueous dispersion of light reflective translucent inorganic crystal particles less than 40 microns in diameter and animal glue hydrolyzed to the stage at which it gives a positive murexide test.

2. The method of making a pearl essence suitable for incorporation in a light transmitting plastic material to impart a pearly lustre thereto which comprises hydrolyzing a glue in an aqueous medium to the stage at which the hydrolysate gives a positive murexide test, forming and precipitating in the resulting hydrolysate light-reflective translucent inorganic crystal particles of a particle size less than 40 microns in diameter and thereafter separating and washing the resulting crystalline material.

WILLIAM E. DECKER.

REFERENCES CITED

The following references are of record in the file of this patent:

UNITED STATES PATENTS

| Number | Name | Date |
|---|---|---|
| 1,525,317 | Paisseau | Feb. 3, 1925 |
| 1,865,703 | Paisseau II | July 5, 1932 |
| 2,311,533 | Gertzog et al. | Feb. 16, 1943 |
| 2,363,570 | Caprio | Nov. 28, 1944 |